United States Patent [19]

d'Alayer de Costemore d'Arc

[11] Patent Number: 4,527,264

[45] Date of Patent: Jul. 2, 1985

[54] COMPACT DISC LOADING AND UNLOADING DEVICE WITH ROTATIONALLY ACTUATED MOVABLE DISC SUPPORT

[75] Inventor: Stephane d'Alayer de Costemore d'Arc, Brussels, Belgium

[73] Assignee: Staar S.A., Brussels, Belgium

[21] Appl. No.: 618,741

[22] Filed: Jun. 8, 1984

[30] Foreign Application Priority Data

Jul. 19, 1983 [BE] Belgium .................. 211201

[51] Int. Cl.³ .................................. G11B 17/04
[52] U.S. Cl. .................................. 369/77.1
[58] Field of Search .................. 369/77.1, 75.2

[56] References Cited

U.S. PATENT DOCUMENTS

| | | | |
|---|---|---|---|
| 2,100,686 | 11/1937 | Collaro et al. | 369/77.1 |
| 3,658,347 | 4/1972 | Cheeseboro | 369/77.1 |
| 4,208,023 | 6/1980 | Demol | 242/198 |
| 4,310,864 | 1/1982 | Pater et al. | 369/75.2 |

FOREIGN PATENT DOCUMENTS 56-58167  5/1981  Japan .................. 369/75.2

Primary Examiner—Steven L. Stephan
Attorney, Agent, or Firm—Leydig, Voit, Osann, Mayer and Holt, Ltd.

[57] ABSTRACT

A loading and unloading device for compact discs includes a disc support movably mounted by means of a plurality of lateral studs which are received in straight slots provided in elements fastened to the fixed frame. The straight slots are parallel to the axis of the drive members for the compact discs and guide the discs in the requisite axial movement. A ring member driven through a restricted rotational distance is utilized for shifting the compact disc support in the axial direction of the compact disc, the ring member having oblique slots receiving the lateral studs and effective upon rotational movement of the ring member in one direction or the other to move each stud along the guide slots to shift the compact disc support in one direction or the other between the loading and operating positions of the recording disc.

3 Claims, 4 Drawing Figures

COMPACT DISC LOADING AND UNLOADING DEVICE WITH ROTATIONALLY ACTUATED MOVABLE DISC SUPPORT

TECHNICAL FIELD

The present invention relates to loading and unloading devices for recording discs and, more particularly, loading and unloading devices for recording and/or playback apparatus for recording discs of the type known as compact discs (CD).

BACKGROUND ART

Compact disc loading and unloading devices in which discs are loaded and unloaded by a combination of in-and-out movement in the plane of the disc and perpendicular movement to cooperate with drive elements for the disc are shown, for example, in commonly assigned, copending U.S. application Ser. No. 437,189, filed Oct. 29, 1982, entitled "Loading And Unloading System For Recording And/Or Playback Apparatus". In this apparatus, the perpendicular movement of the disc, which is axially of the disc, is obtained by flat side plates which are movable back and forth and have oblique slots cooperating with studs extending from the movable disc support. Another disc loading and unloading apparatus is disclosed in commonly assigned U.S. application Ser. No. 454,240, filed Dec. 29, 1982, entitled "Loading And Unloading Mechanism For Slot-Type Disc Player Apparatus". This apparatus has a perpendicularly movable support, the support in this instance being movable by means of a helical mechanism which converts the partial rotation of the support to axial movement of the recording disc.

DISCLOSURE OF INVENTION

The principal object of the present invention is to provide an improved loading and unloading apparatus of the same general type disclosed in the prior applications which is simple in construction and is effective to precisely and smoothly shift the compact disc axially between loading and operating positions.

According to the present invention, the compact disc support is movably mounted by means of a plurality of lateral studs which are received in straight slots provided in elements fastened to the fixed frame. The straight slots are parallel to the axis of the drive members for the compact discs and guide the discs in the requisite axial movement. A ring member driven through a restricted rotational distance is utilized for shifting the compact disc support in the axial direction of the compact disc, the ring member having oblique slots receiving the lateral studs and effective upon rotational movement of the ring member in one direction or the reverse direction to move each stud along the guide slots to shift the compact disc support in one direction or the reverse direction between the loading and operating positions of the recording disc.

BRIEF DESCRIPTION OF DRAWINGS

Further objects will appear from the following description taken in conjunction with the accompanying drawings, in which.

BEST MODE FOR CARRYING OUT THE INVENTION

Figure 1:
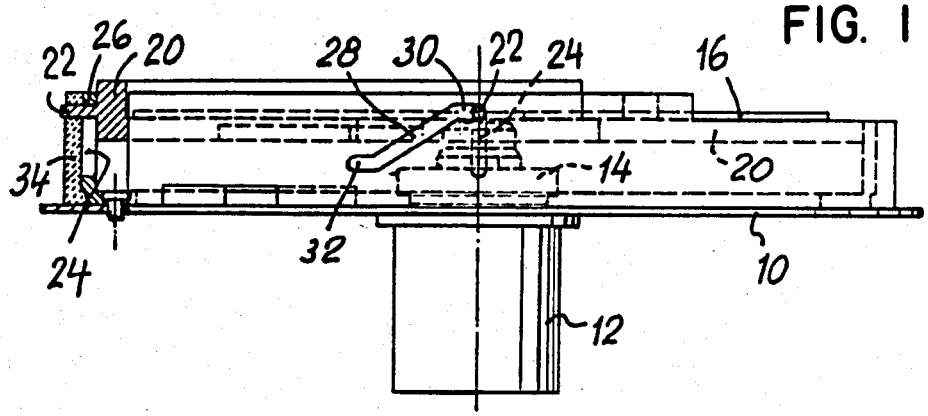
FIG. 1 is a side view partially in section along the line I—I in FIG. 2 of a device embodying the invention in the disc loading position.
Figure 2:
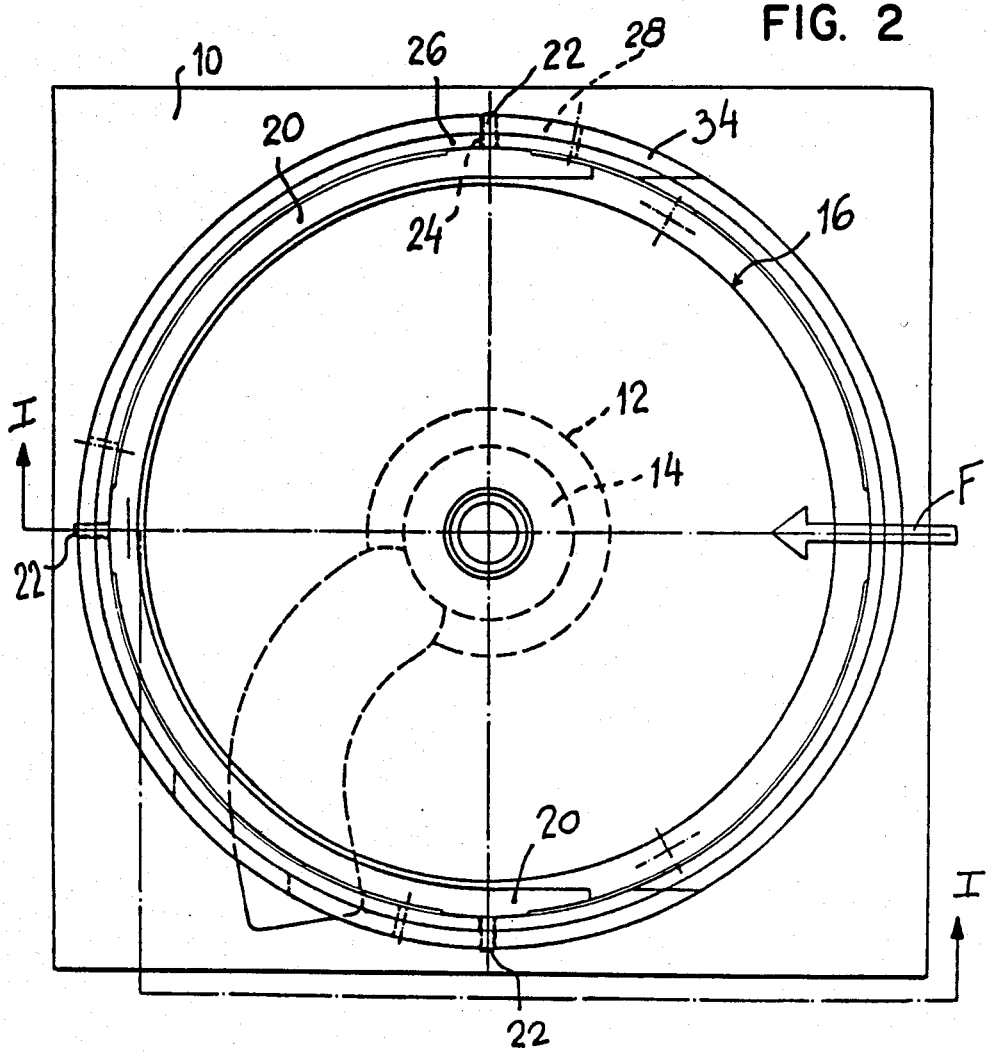
FIG. 2 is a plan view of the device shown in FIG. 1.

Referring to FIGS. 1 and 2, the frame 10 of a recording and/or playback apparatus for a compact disc includes a motor 12 having a drive hub 14 for rotating a disc.

Figure 4:
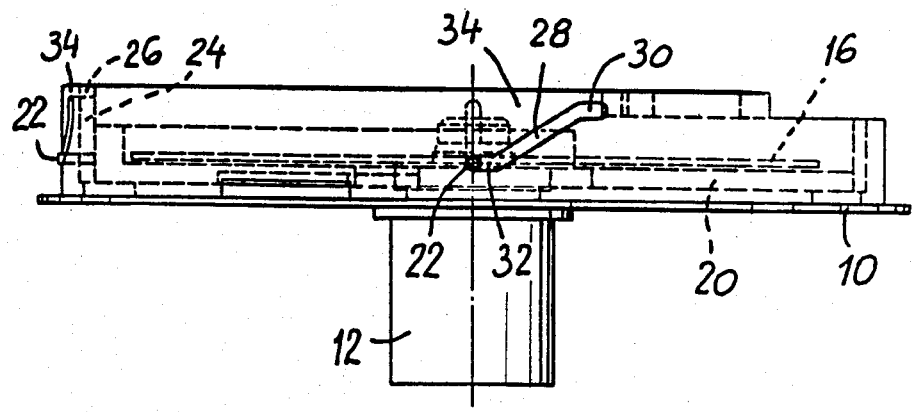
FIG. 4 is a side view similar to FIG. 1 with the disc in the operating position.

In accordance with the invention, there is provided on the frame 10 a circular movable support 20 for receiving the disc 16 and moving the disc axially between the loading position (FIG. 1) and the operating position (FIG. 4). The compact disc is placed in the loading position, for example, it may be slid edge-first in a horizontal plane to the loading position through an entrance slot (not shown) and guided in such movement by the side guide rails 20A, 20B when the invention is incorporated in a slot-type player as shown in commonly assigned U.S. application Ser. No. 441,923, filed Nov. 15, 1982, entitled "Slot-Type Disc Recorder And/Or Player Apparatus".

Figure 3:
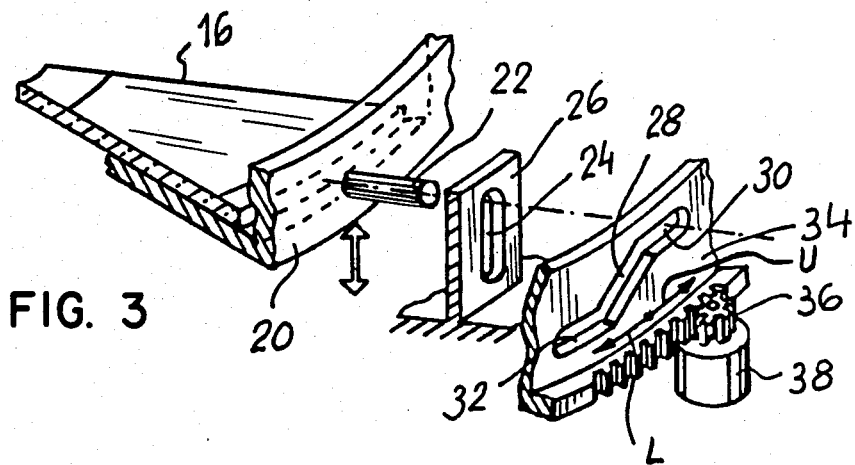
FIG. 3 is an exploded, fragmentary view showing, in principal, the components for operating a movable disc support to place a disc in the operating position.

In order to move the disc axially from the loading position (FIG. 1) to the operating position (FIG. 4), the movable support 20 carries lateral studs 22, three in the present case, each of which penetrates through a guide slot 24 in an element 26 fastened to the frame, the slot 24 comprising a straight slot extending parallel to the axis of the disc and the axis of the drive means 12, 14 for the disc. The guide slots 24 guide the movable support 20 as it moves perpendicular to the plane of the disc, which is in the vertical direction when the device is mounted in the orientation shown in FIG. 1, with the disc supported in a horizontal plane. The studs 22 also extend into an oblique slot 28 provided in a mobile peripheral element, preferably a rotatable ring member 34, which is power rotated by means herein shown as the pinion 36 of a motor 38 (FIG. 3). The oblique slot 28 ends in two stabilizing branches perpendicular to the guide slots 24. One branch 30 corresponds to the loading position of the disc 16 and the other branch 32 corresponds to the operating position of the disc.

In the operation of the loading and unloading device of this invention, after the disc has been placed on the drive member 14, for example, by inserting the disc 16 (in the direction of the arrow F in FIG. 2) into the apparatus through an insertion slot, a switch (not shown) for detecting the presence of the disc initiates the operation of the motor 38 which, by means of its pinion 36 engaged in the rack teeth 34A on the ring member, rotates the ring member 34 through a restricted rotational distance in the direction of the arrow L in FIG. 3.

It will, therefore, be understood that the studs 22 of the movable support 20, which were in the loading position in FIG. 1, are moved by the edges of the oblique slot 28 vertically downwards toward the operating position shown in FIG. 4 while being guided by the slots 24 parallel to the axis of the drive means 12, 14 of the disc 16. The movement of the studs 22 carries support 20 to the operating position (FIG. 4). For the unloading operation, by rotating the ring 34 through a restricted rotational distance in the direction of the arrow U in FIG. 3, the studs 22 of the movable support 20 are moved vertically upwards by the edges of the oblique slot 28 towards the loading position in FIG. 1 while being guided by the slots 24 to carry the support 20 to the unloading/loading position (FIG. 1).

The two stable position branches 30 and 32 of the slot 28 hold the studs 22 at one end or the other end of the slot 24 and thus lock the movable support 20 bearing the disc in the loading position (FIG. 1) or the operating position (FIG. 4). By rotating the ring member 34 in one direction or the other, the movable support is moved vertically in one direction or the other between the loading and operating positions. The ring member is rotated in one direction by the motor initiated by the disc when it is loaded and placed in the loading position and reversed in the other direction to unload the disc when the recording or playback operation is complete.

I claim:

1. In a loading and unloading device for disc recording/playback apparatus, said device having a frame, a disc support movably mounted on the frame for movement of the disc along its axis between a loading position and an operating position, the improvement comprising:

a plurality of studs extending laterally from said movable disc support, elements fastened to the frame providing a plurality of straight guide slots extending parallel to said axis of the disc for receiving said studs and guiding the movement of said disc support, a ring member mounted on the frame for rotational movement about the axis of the disc and having a plurality of oblique slots, each intersecting one of said straight slots and each of said studs extending through a pair of slots where they intersect, and means for rotating said ring member in one direction or the reverse direction through a restricted rotational distance to move said studs along said straight guide slots by the engagement of the edges of said oblique slots against said studs and move said disc support in one direction or the reverse direction between said loading and unloading positions of the disc.

2. A loading and unloading device according to claim 1 wherein said means for rotating said ring member includes a motor and a drive connecting said motor to rotate said ring member in one direction which is initiated by the disc when it is loaded and in the reverse direction to unload the disc.

3. A loading and unloading device according to claim 1, said oblique slots in said ring member having end segments extending substantially perpendicularly to said straight guide slots for locking the movable support in the loading and unloading positions.

* * * * *